US011970142B2

United States Patent
Goemer et al.

(10) Patent No.: US 11,970,142 B2
(45) Date of Patent: Apr. 30, 2024

(54) SYSTEMS FOR EXPELLING DEBRIS

(71) Applicant: Toyota Motor North America, Inc., Plano, TX (US)

(72) Inventors: David M. Goemer, Frisco, TX (US); Evan Vijithakumara, Frisco, TX (US); Imad Zahid, Carrollton, TX (US); Lizbeth Jurado, El Paso, TX (US); Lou Pope, Flower Mound, TX (US); Yuho Kozu, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 270 days.

(21) Appl. No.: 17/235,748

(22) Filed: Apr. 20, 2021

(65) Prior Publication Data
US 2022/0332292 A1  Oct. 20, 2022

(51) Int. Cl.
*B60S 1/64* (2006.01)
*B08B 5/02* (2006.01)
*B08B 7/02* (2006.01)

(52) U.S. Cl.
CPC ............... *B60S 1/64* (2013.01); *B08B 5/02* (2013.01); *B08B 7/02* (2013.01)

(58) Field of Classification Search
CPC .................................... B60S 1/64; B08B 7/02
See application file for complete search history.

(56) References Cited

U.S. PATENT DOCUMENTS

| 8,087,297 | B2 | 1/2012 | Ludwiczak |
| 9,970,856 | B2 | 5/2018 | Kwon et al. |
| 10,124,772 | B1 | 11/2018 | Hartman |
| 10,375,477 | B1* | 8/2019 | Murrish .................. H04R 3/14 |
| 2008/0085018 | A1 | 4/2008 | Troxell et al. |
| 2017/0088051 | A1* | 3/2017 | Levin ...................... G06F 3/016 |
| 2018/0307926 | A1* | 10/2018 | Tokatyan ............... G06V 20/59 |
| 2020/0061223 | A1* | 2/2020 | Hallack .................. B60N 2/002 |

FOREIGN PATENT DOCUMENTS

| JP | 2009166772 A | 7/2009 |
| WO | 2020126826 A1 | 6/2020 |

* cited by examiner

*Primary Examiner* — Andrew A Horton
(74) *Attorney, Agent, or Firm* — Dinsmore & Shohl LLP

(57) ABSTRACT

A system for dislodging debris from one or more surfaces includes an air inlet, an air outlet fluidly coupled with the air inlet, an air jet forming a trainable air stream between the air inlet and the air outlet, and a vibration device comprising a vibration controller, and one or more vibrators. The vibration device creates vibrations such that debris on the one or more surfaces is dislodged such that debris is captured in the trainable air stream, and the air stream carries the dislodged debris to the air outlet.

20 Claims, 3 Drawing Sheets

SYSTEMS FOR EXPELLING DEBRIS

TECHNICAL FIELD

The present specification generally relates to expelling debris from the cabin of a vehicle or other enclosed space and, more specifically, to expelling debris from the cabin of a vehicle or other enclosed space using a combination of vibration and airflow.

BACKGROUND

Dust, dirt, and other debris may accumulate in hard-to-reach locations within a vehicle (e.g., in cup holders, crevices, and other crannies). This debris may buildup over time, resulting in an unsightly and unclean interior. Moreover, such debris may result in the malfunction of some vehicle systems, for example, debris may negatively affect audio quality or interfere with air conditioning system function. Accordingly, a need exists for alternative systems and methods for expelling debris from the cabin of a vehicle.

SUMMARY

In one embodiment, a system for dislodging debris from one or more surfaces includes an air inlet, an air outlet fluidly coupled with the air inlet, an air jet forming a trainable air stream between the air inlet and the air outlet, and a vibration device comprising a vibration controller, and one or more vibrators. The vibration device creates vibrations such that debris on the one or more surfaces is dislodged such that debris is captured in the trainable air stream, and the air stream carries the dislodged debris to the air outlet.

A vehicle comprising a cabin and a system for dislodging and expelling debris from the cabin comprising an air inlet, an air outlet fluidly coupled with the air inlet, an air jet forming a trainable air stream between the air inlet and the air outlet, and a vibration device comprising a vibration controller and one or more vibrators. The vibration device creates vibrations such that debris on one or more surfaces of the vehicle is dislodged such that debris is captured in the trainable air stream, and the trainable air stream carries the dislodged debris to the air outlet.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
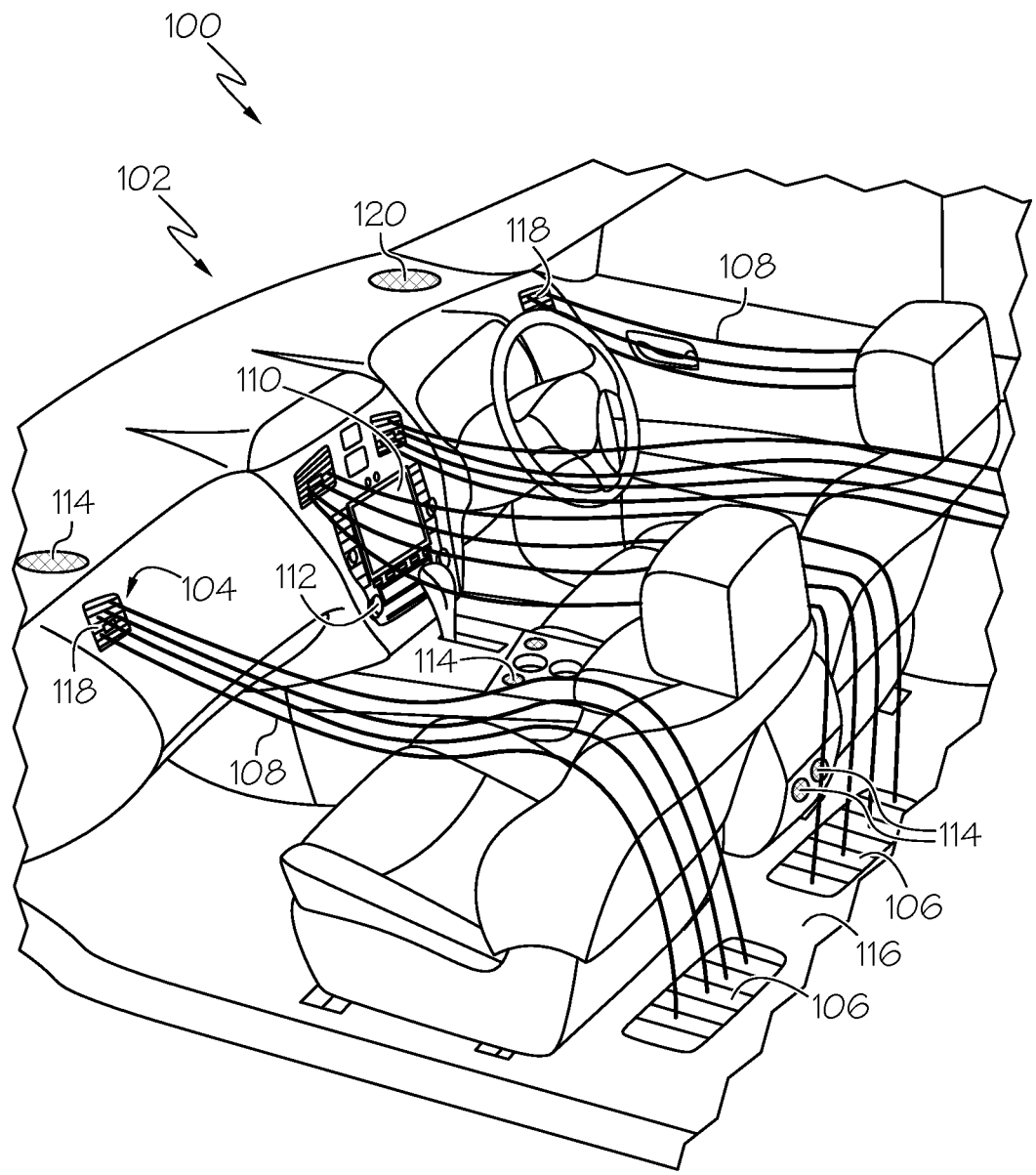
FIG. 2 depicts an interior view of the cabin of FIG. 1, according to one or more embodiments shown and described herein.

FIG. 2 generally depicts an interior of a vehicle that includes one embodiment of a system for expelling debris from a cabin of the vehicle, according to one or more embodiments shown and described herein. Various embodiments of the system for expelling debris from the cabin of the vehicle and the operation thereof are described in detail herein.

Figure 1:
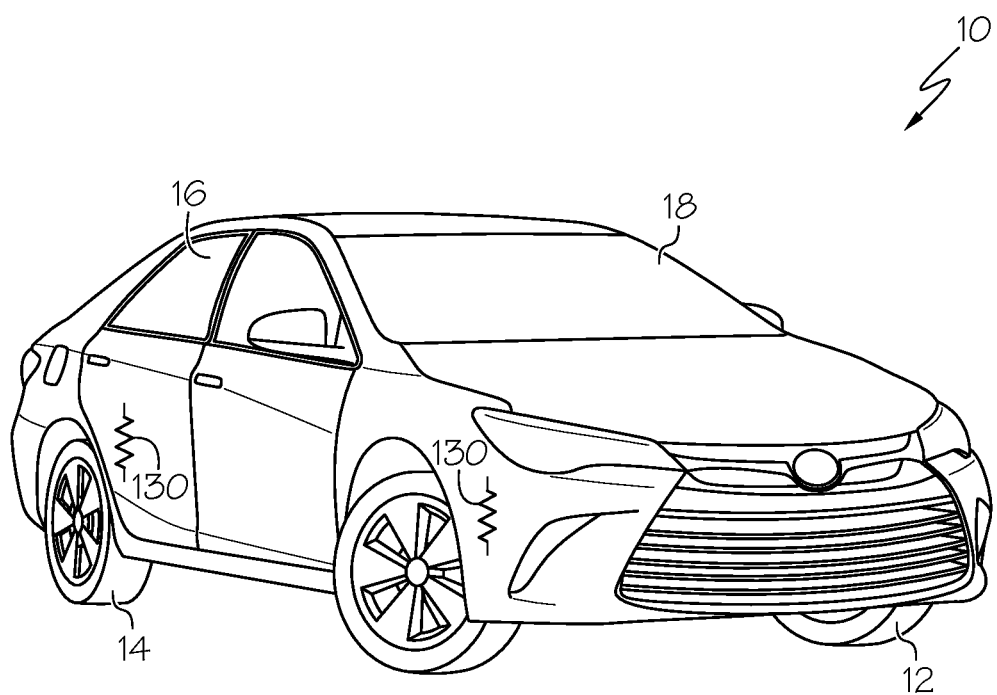
FIG. 1 depicts a vehicle including a system for expelling debris from a cabin of the vehicle, according to one or more embodiments shown and described herein.

Referring now to FIG. 1, a vehicle 10 is shown. The vehicle 10 includes front wheels 12 and rear wheels 14. The vehicle 10 further includes windows 16, and a windshield 18. The vehicle depicted in FIG. 1 is a sedan, however, it is contemplated that embodiments of the systems described herein could be affected in various models, makes, and body styles of vehicles without substantively changing the operation or arrangement thereof. For example, the systems and methods described herein could be implemented in a sedan, a truck, a coupe, a convertible, or other vehicle with a cabin.

Referring now to FIG. 2, a cabin 100 of the vehicle 10 of FIG. 1 is shown. Still referring to FIG. 1, the cabin 100 includes a system 102 for dislodging and expelling debris. The system includes one or more air inlets 104, and one or more air outlets 106 that may be fluidly coupled with the air inlet 104, an air jet (not pictured in FIG. 2) may form an air stream 108 between the air inlet 104 and the air outlet 106 and a vibration device controlled, for example, by a control unit 110. The direction of the air stream 108 may be affected by one or more louvres 118.

The vibration device may include a vibration controller 112 (e.g., a volume knob), and one or more vibrators 114 (e.g., speakers). In embodiments, the vibration device may create vibrations such that debris on one or more surfaces of the vehicle 10 is dislodged. The air stream 108 created by the air jet (not pictured) forcing air from the air inlet 104 to the air outlet 106 may carry the debris to the air outlet 106, thereby removing the debris from the cabin 100 of the vehicle 10. Some embodiments of the system may not include air outlets 106, for example, embodiments in which the air entering the cabin 100 through the air inlets 104 is vented to atmosphere outside the vehicle 10.

In some embodiments, the air inlet 104 is open to the atmosphere surrounding the vehicle 10 (FIG. 1). In other embodiments, the air inlet 104 may recirculate air within the vehicle 10 through openings to the cabin 100. The air outlet 106 may be open to the atmosphere outside the cabin or may recirculate air to the air inlet 104. In some embodiments, a filter (not shown) may be placed between the air outlet 106 and the atmosphere to filter debris removed from the cabin 100. Some embodiments may not include an air outlet 106, such as embodiments in which debris dislodged by vibration and/or trapped in the air stream may deposit on a floor 116 of the cabin 100.

Still referring to FIG. 2, in some embodiments, the vehicle 10 includes vibrators 114. The vibrators 114 may be configured as audio speakers 120 and/or other devices for creating vibration at a predetermined frequency. The vibrators 114 may vibrate various surfaces of the vehicle to dislodge debris from on and around the surfaces. The vibrators 114 may use subsonic, sonic, and ultrasonic vibrations to dislodge debris. The vibrators 114 may be placed at various locations throughout the cabin, for example, in difficult to clean locations within the cabin 100 (e.g., cup holders, slats, crevices, etc.) The amplitude and frequency of vibration of the vibrators 114 may be controlled by the control unit 110. In some embodiments, the amplitude and frequency may be controlled, for example, by turning up the volume of an audio system of the vehicle 10.

Referring again to FIG. 1, in some embodiments, the vehicle 10 may include an active suspension 130. The active suspension 130 may vibrate the vehicle 10 to dislodge debris within the cabin 100 (FIG. 2) of the vehicle 10. The active suspension 130 may include one or more shocks, struts, springs, or other mechanism for imparting or damping vibrations to the vehicle 10. The active suspension 130 may be controlled by a controller 124 (FIG. 2).

Figure 3:
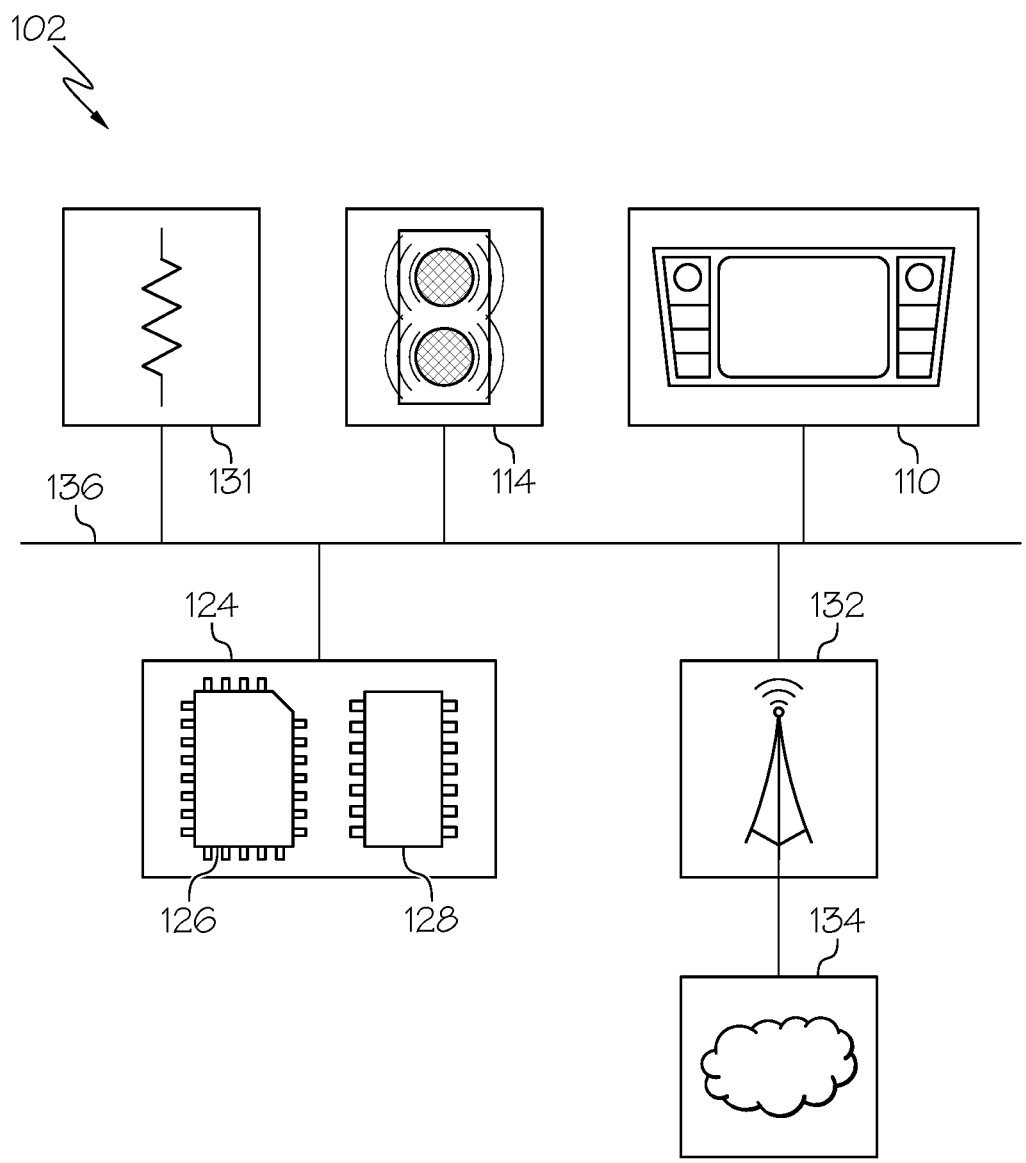
FIG. 3 depicts a schematic view of the system for expelling debris from a cabin of the vehicle of FIG. 1, according to one or more embodiments shown and described herein.

Referring now to FIG. 3, a schematic of the system 102 for dislodging debris from one or more surfaces of the vehicle 10 is shown. As shown in FIG. 3, the system 102 includes a controller 124, which may include, for example, one or more processors 126 and one or more memory modules 128 storing one or more machine readable instructions. Accordingly, the one or more processors 126 may be a controller, an integrated circuit, a microchip, a computer, or any other computing device. The system 102 may include a control unit 110 (e.g., a heads-up display) including a user interface for providing operating instructions to the system 102. The controller 124 may be communicatively coupled to an active suspension module 131 for activating the active suspension 130 (FIG. 1). In some embodiments, the system 102 may include network interface hardware 132 which may communicatively couple the system 102 to a network 134. Components of the system 102 may be communicatively coupled by, for example, a communication path 136.

The network interface hardware 132 may communicatively couple the controller 124 to the network 134. The network interface hardware 132 may be any device capable of transmitting and/or receiving data with external vehicles or servers directly or via a network, such as the network 134. Accordingly, network interface hardware 132 can include a communication transceiver for sending and/or receiving any wired or wireless communication. For example, the network interface hardware 132 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 132 may include hardware configured to operate in accordance with the Bluetooth wireless communication protocol and may include a Bluetooth send/receive module for sending and receiving Bluetooth communications.

The network 134 may include, for example, one or more computer networks (e.g., a personal area network, a local area network, grid computing network, wide area network, etc.), cellular networks, satellite networks and/or a global positioning system and combinations thereof. Accordingly, the controller 124 and the vehicle 10 (FIG. 1) can be communicatively coupled to the network 134 and/or one another via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The active suspension module 131 may control the components of the suspension of the vehicle 10 (e.g., shocks, springs, struts, etc.) to impart vibrations to the vehicle 10. In some embodiments, the active suspension module 131 is designed to interact with the control unit 110 to impart vibrations to the vehicle in sync or otherwise based on the vibrations imparted by the one or more vibrators 114 such that the maximum amount of debris can be dislodged from the various crevices, cracks, and other spaces of the vehicle which may hold debris. A user may control the active suspension module 131, for example, through a user interface in the control unit 110 or using some other control means. In some embodiments, a user of the system 102 may control the vibrations of the vehicle 10 remotely through a connection with the system 102 through the network 134.

Briefly referring to FIGS. 1 and 3, In some embodiments, the one or more louvres 118 may be automatically controlled to affect the stream of air within the vehicle 10. The louvres 118 may be moved in order to train the air stream 108 toward the areas of the vehicle 10 which may have dust, dirt, or debris therein. A user may control the direction of air flow using, for example, a user interface in the control unit 110 or using some other control means. In some embodiments, a user of the system 102 may control the direction of airflow remotely through a connection with the system 102 through the network 134.

In some embodiments, the controller 124 may control one or more components of the system 102 such that they operate together to remove or dislodge debris from the environment. For example, the controller 124 may control the velocity and/or volumetric flow of air through the air jet, may activate or deactivate particular air jets in one or more targeted areas, may direct the airflow using the louvres 118, and/or may change the frequency and/or amplitude of vibrations of the vibration device, and/or the frequency and/or amplitude of vibration created by the active suspension 130 in order to remove dirt and debris from the vehicle 10. In some embodiments, the activation or control of any of these components may be automatic based on identification of a particular user associated with the vehicle (e.g., based on the identification of a smart phone or other device within proximity of the vehicle 10). In other embodiments, the controller 124 may receive feedback regarding the cleanliness of the cabin 100 (e.g., based on user feedback, installed sensors capable of detecting the cleanliness thereof, etc.) of the vehicle 10 and may self-learn one or more routines optimal for cleaning the cabin 100.

Referring now to FIGS. 1, 2, and 3, operation of the system 102 for expelling debris from the cabin of a vehicle is described in greater detail. A user may utilize the control unit 110 to activate the system 102 while driving, for example. In yet other embodiments, a user may activate the system 102 remotely. For example, the user may use an app on his or her network-connected device (e.g., smartphone) to activate the system 102 to expel debris. In this example, a user may connect his or her smartphone to the system 102 through the connection with the network interface hardware 132 through the network 134 (e.g., the cloud). Once activated, the system 102 may simultaneously vibrate the vehicle 10 using the active suspension 130 and various of the surfaces therein using the vibrators 114 (e.g., speakers in the cabin and/or other vibrators). Accordingly, dust trapped in or on one or more surfaces of the vehicle 10 may be dislodged. A user may increase the amplitude or frequency of vibration to affect how the debris dislodges from the various surfaces. For example, a user may increase the amplitude of vibrations by increasing the volume of audio playing through the speakers (e.g., using the vibration controller 112). In some embodiments, the vibrators 114 may be in difficult-to-clean areas or areas that are prone to collect dust, dirt, and debris (e.g., below cupholders, in/on consoles, etc.)

Simultaneously, the system 102 may increase airflow within the cabin 100 by increasing the amount of air pushed through the air jet (not pictured). The air stream 108 may enter the cabin through the air inlets 104 and may carry debris (e.g., dust) from the surfaces to the air outlets 106. Not all embodiments of the system 102 include air outlets 106 and the air stream 108 may merely be vented to the atmosphere within the cabin 100. For example, in some embodiments, the dislodged debris may be removed from the surfaces of the cabin 100, carried by either the air stream 108 and/or gravity, and may carried by the air stream 108 until it falls to the floor of the vehicle 10 where it can be conveniently captured (e.g., by a vacuum).

It should now be understood that a system for dislodging debris from the surfaces of the cabin of a vehicle can include an active suspension or other means for vibrating the vehicle and one or more vibrators (e.g., speakers) within the vehicle for dislodging debris from various surfaces. Such a system can carry dust, dirt, and other debris from the surfaces of the vehicle to a more convenient location such that the vehicle can be cleaned more conveniently providing the users thereof a more positive and pleasant experience with the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for dislodging debris from one or more surfaces comprising:
    an air inlet;
    an air outlet fluidly coupled with the air inlet;
    an air jet forming a trainable air stream between the air inlet and the air outlet; and
    a vibration device comprising:
        a vibration controller; and
        one or more vibrators, wherein
    the vibration controller is configured to receive user input to alter the frequency of the vibration device,
    the vibration device creates vibrations such that debris on the one or more surfaces is dislodged such that debris is captured in the trainable air stream, and
    the air stream carries the dislodged debris to the air outlet.

2. The system of claim 1, further comprising a vehicle comprising an active suspension, wherein the active suspension vibrates the vehicle to dislodge debris on the one or more surfaces.

3. The system of claim 2, wherein the vibrations created by the vibration device and the active suspension are coincident.

4. The system of claim 2, wherein the active suspension imparts vibrations to the vehicle in sync with the vibrations imparted by the one or more vibrators.

5. The system of claim 1, wherein the air jet is a compressed air jet.

6. The system of claim 5, wherein the trainable air stream is trainable using one or more louvres.

7. The system of claim 1, wherein the vibration device is an audio system comprising an audio controller and one or more speakers.

8. The system of claim 1, wherein the vibration device vibrates the one or more surfaces in acoustic resonance using one or more of ultrasonic, sonic, and subsonic vibrations.

9. The system of claim 1, wherein control of the vibration device is automatic based on identification of a particular user associated with a vehicle.

10. The system of claim 1, wherein the system determines cleanliness of the one or more surfaces and self-learns one or more routines for cleaning the one or more surfaces.

11. A vehicle comprising:
    a cabin; and
    a system for dislodging and expelling debris from the cabin comprising:
        an air inlet;
        an air outlet fluidly coupled with the air inlet;
        an air jet forming a trainable air stream between the air inlet and the air outlet; and
        a vibration device comprising:
            a vibration controller; and
            one or more vibrators, wherein
        the vibration controller is configured to receive user input to alter the frequency of the vibration device,
        the vibration device creates vibrations such that debris on one or more surfaces of the vehicle is dislodged such that debris is captured in the trainable air stream, and
        the trainable air stream carries the dislodged debris to the air outlet.

12. The vehicle of claim 11, further comprising:
    an active suspension, wherein the active suspension vibrates the vehicle to dislodge debris on the one or more surfaces.

13. The vehicle of claim 12, wherein one or more of the vibration device and the active suspension creates acoustic resonance using one or more of ultrasonic, sonic, and subsonic vibrations.

14. The vehicle of claim 12, wherein the active suspension imparts vibrations to the vehicle in sync with the vibrations imparted by the one or more vibrators.

15. The vehicle of claim 11, wherein the air jet is a compressed air jet.

16. The vehicle of claim 15, wherein the trainable air stream is trainable using one or more louvres.

17. The system of claim 1, wherein the vibration device is positioned proximate to at least one of the following: a cup holder, slat, or a crevice to dislodge debris therefrom.

18. The vehicle of claim 11, wherein the vibration device is positioned proximate to at least one of the following: a cup holder, slat, or a crevice to dislodge debris therefrom.

19. The vehicle of claim 11, wherein control of the vibration device is automatic based on identification of a particular user associated with the vehicle.

20. The vehicle of claim 11, wherein the system determines cleanliness of the cabin and self-learns one or more routines for cleaning the cabin.

* * * * *